United States Patent

Kiuchi et al.

[11] Patent Number: 5,183,632
[45] Date of Patent: Feb. 2, 1993

[54] METHOD OF MANUFACTURING AN ALUMINUM-BASE COMPOSITE DISC ROTOR

[75] Inventors: Manabu Kiuchi, Zushi; Masao Arai, Kumagaya, both of Japan

[73] Assignees: Akebono Brake Industry Co., Ltd., Tokyo; Akebono Research and Development Centre Ltd., Hanyu, both of Japan

[21] Appl. No.: 845,194

[22] Filed: Mar. 3, 1992

[30] Foreign Application Priority Data

Mar. 20, 1991 [JP] Japan .................................. 3-81814

[51] Int. Cl.$^5$ .............................................. B22F 3/14
[52] U.S. Cl. ........................................ 419/48; 419/10; 419/27; 419/29; 419/47
[58] Field of Search ...................... 419/6, 9, 10, 27, 29, 419/47, 48

[56] References Cited

U.S. PATENT DOCUMENTS

| | | | |
|---|---|---|---|
| 2,077,345 | 4/1937 | Van Der Pyl | 419/27 |
| 2,161,597 | 6/1939 | Swartz | 419/27 |
| 2,193,413 | 3/1940 | Wright | 419/47 |
| 3,359,095 | 12/1967 | Foerster et al. | 419/27 |
| 3,891,398 | 6/1975 | Odier | 29/182.2 |
| 4,172,719 | 10/1979 | McGee et al. | 75/232 |
| 4,280,841 | 7/1981 | Ito et al. | 75/203 |
| 4,412,643 | 11/1983 | Sato et al. | 228/221 |
| 4,460,541 | 7/1984 | Singleton et al. | 419/42 |
| 4,659,547 | 4/1987 | Svensson et al. | 419/6 |
| 4,793,967 | 12/1988 | Pryor et al. | 419/19 |
| 4,883,638 | 11/1989 | Blankenhagen et al. | 419/9 |

*Primary Examiner*—Donald P. Walsh
*Assistant Examiner*—Daniel Jenkins
*Attorney, Agent, or Firm*—Oblon, Spivak, McClelland, Maier & Neustadt

[57] ABSTRACT

A method of manufacturing an aluminum-base composite disc rotor comprising the steps of preparing a rough-shaped disc rotor made of a mixture of aluminum powder or aluminum alloy powder with reinforcing particles or aluminum alloy, placing a mixture of aluminum powder or aluminum alloy powder with reinforcing particles or a preform made thereof on each of fixed positions of the rough-shaped disc rotor, and heating the mixture or the preform to at least a region of mashy state temperature to mold under pressure. Thereby the heat resistance and the wear resistance of the aluminum-base composite disc rotor for light-duty cars and industrial machinery are improved.

4 Claims, 1 Drawing Sheet

METHOD OF MANUFACTURING AN ALUMINUM-BASE COMPOSITE DISC ROTOR

BACKGROUND OF THE INVENTION

The present invention relates to a light-duty disc rotor usable for brakes, etc. for cars and industrial machinery, which is particularly excellent in the heat resistance and the wear resistance and light in weight.

So far, for improving the wear resistance, etc. of the light-duty disc rotor, there have been a method of manufacturing a disc rotor by compositing reinforcing particles such as ceramic particles into aluminum alloy by casting method such as squeeze casting, a method of manufacturing a disc rotor by molding with hot press after alternately piling up aluminum foil and prepreg of carbon fibers, and the like.

However, by the former method aforementioned, the reinforcing particles can only be contained in amount of about 20 vol. % at maximum leading to insufficient effect and, by the latter method, the complicated manufacturing process becomes expensive.

As a result of extensive investigations in view of this situation, an aluminum-base composite disc rotor with excellent heat resistance and wear resistance are obtainable and inexpensive.

SUMMARY OF THE INVENTION

The invention is characterized in that, after preparing a rough-shaped disc rotor made of a mixture of aluminum powder or aluminum alloy powder with reinforcing particles or aluminum alloy, a mixture of aluminum powder of aluminum alloy powder with reinforcing particles or a preform made thereof is placed on each of fixed position of the rough-shaped disc rotor, and the mixture of the preform is heated to at least a region of mashy state temperature to mold under pressure.

DETAILED DESCRIPTION OF THE INVENTION

According to the invention as described above, aluminum powder and reinforcing particles such as ceramic particles are mixed and stirred beforehand, thus it is possible to obtain a material with uniform quality in accurate proportion.

Moreover, if using said mixture or the preform made thereof, said mixture, etc. can be placed only on the desired positions of rough-shaped disc rotor prepared beforehand with aluminum alloy, thereby the characteristics such as wear resistance can be improved only at the desired portions of disc rotor by compositing.

Furthermore, since said mixture of the preform made thereof is molded in a region of its mashy state temperature (semimolten temperature) on compositing, there are no molding defects at the improved portions of characteristics and further, since it is not molten completely, the energy conservation can be achieved.

The compositing is possible taking a mixing level of reinforcing particles to aluminum powder or aluminum alloy powder in a wide range of proportion of about 10 to 90 vol. %.

Figure 1:
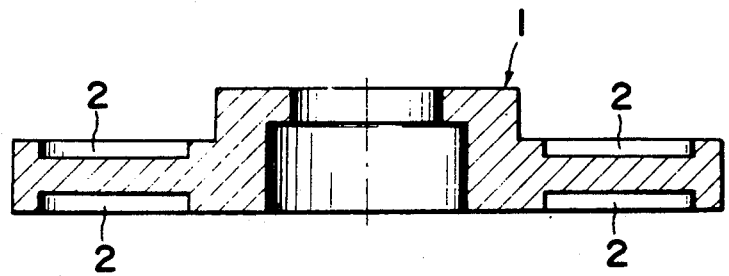
FIG. 1 is a side sectional view showing the rough-shaped disc rotor.
Figure 2:
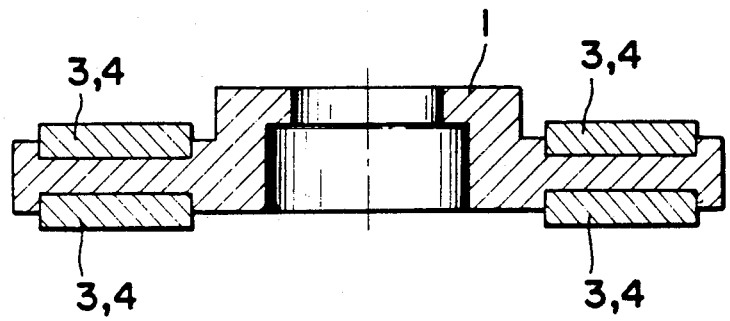
FIG. 2 is a side sectional view showing the state of having attached a mixture of aluminum powder with reinforcing particles or a preform made thereof onto the rough-shaped disc rotor.
Figure 3:
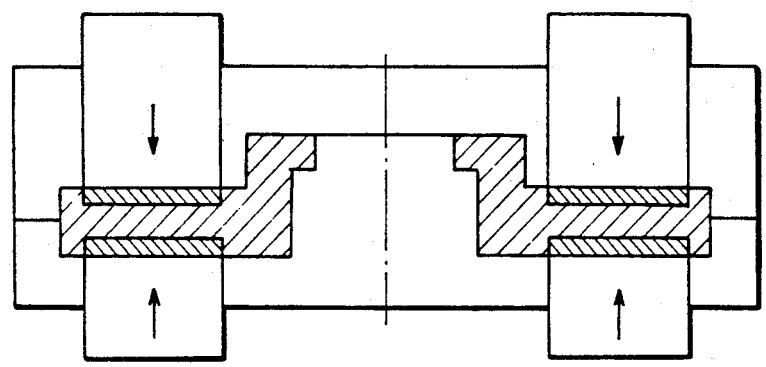
FIG. 3 is a side sectional view showing the state of having molded the mixture of aluminum powder with reinforcing particles or the preform made thereof attached onto the rough-shaped disc rotor under pressure.

In following, the manufacturing method of the invention will be illustrated in more detail using the drawings. ① A rough-shaped aluminum alloy disc rotor (1) as shown in FIG. 1 is prepared by the methods such as squeeze casting and press molding and the portions therein (compositing portions (2)) to improve the wear resistance, etc. by compositing are machined into a shape required. ② Mixture (3) obtained by mixing and stirring aluminum alloy powder being same type as or resemblant to said rough-shaped material (1) with ceramic powders such as SiC, $Al_2O_3$ and TiC (particle diameter, type and mixing rate are properly chosen depending on the characteristics required) is placed on each of said compositing portions (2) as shown in FIG. 2. Or, depending on the shape of product, preformed article (4) molded said mixed powder beforehand at ambient temperature under pressure is placed or attached onto each of said compositing portions (2). ③ The rough-shaped disc rotor (1) attached with said mixture (3) or the preform (4) made thereof is heated and kept at a temperature (region of mashy state temperature) where portions of this mixture (3) or the preform (4) made thereof coexist in solid phase and liquid phase, followed by molding under pressure for compositing as shown in FIG. 3. In this heating, the rough-shaped material (1) can be heated totally, but partial heating, that is, heating only the compositing portions (2) by high-frequency induction heating is more advantageous from the points of heat efficiency and prevention of the deterioration in characteristics of rough-shaped material. ④ Thereafter, the post-treatments such as machining, heat treatment and surface treatment and finishing treatment are performed, if necessary, as usual.

To composite the overall disc rotor, the rough-shaped material of aluminum alloy as described above can be prepared beforehand. The shape of disc rotor may be molded with said mixture to carry out the molding in a region of its mashy state temperature under pressure.

In following, the example of the invention will be illustrated.

EXAMPLE

Using casting aluminum alloy AA356 (AA standard), a rough-shaped material (1) in the shape of disc rotor as shown in FIG. 1 was prepared by casting method. At this time, spaces (compositing portions (2)) for attaching following composite are secured at the sliding portions of said rotor with opposite friction material.

Next, a mixture of aluminum alloy AA356 powder with silicon carbide SiC particles in a volume ratio of 50:50 was stirred for 20 minutes in a grinding machine (stirring machine) to mix enough uniformly, then this mixture was transferred to a metal mold in a fixed shape and molded at ambient temperature under pressure with hydraulic press to make a preform (4).

This preform (4) was placed on each of said compositing portions (2). Then, this rough-shaped material was heated to a mashy state temperature of said AA356 in a high-frequency induction heating furnace and, after setting this rough-shaped material into a metal mold heated preliminarily, it was molded under pressure.

Then, said rough-shaped material thus molded under pressure was submitted to solid solution treatment under the conditions that, after keeping it for 6 hours at 520° C., it was cooled with water and further, after keeping it for 6 hours at 170° C., it was cooled with water. Thereafter, it was machined into a fixed shape to produce a disc rotor.

With said disc rotor by the inventive method and a disc rotor by following comparative method, the friction test was performed under the conditions shown in Table 1 using non-asbestos non-steel material as an opposite friction member (brake pad). The results thus comparatively examined respective characteristics are shown in Table 2. The disc rotor by comparative method was preduced in such a way that SiC particles were mixed with aluminum alloy AA356 at a volume rate of 20% to produce overall disc rotor by casting method.

TABLE 1

| Test condition | Braking start temperature °C. | Number of times of brakings | Deceleration G | Initial velocity km/h |
|---|---|---|---|---|
| A | 120 | 200 | 0.35 | 65 |
| B | 50 300 | 10 100 | | (18 m/s) |

TABLE 2

| Manufacturing method | Test condition | Average friction coeficient | Wear level of disc rotor μm | Wear level of brake pad mm | Property of sliding surface |
|---|---|---|---|---|---|
| Inventive method | A | 0.37 | 0 | 0.01 | Smooth |
| | B | 0.44 | 5 | 0.05 | Smooth |
| Comparative method | A | 0.30 | 5 | 0.08 | Smooth |
| | B | 0.39 | 50 | 0.23 | Wild |

From Table 2, the disc rotor by the inventive method has higher average friction coefficients under all same conditions when compared with that by the comparative method. Further, with respect to the wear levels of disc rotor concerned and brake pad, it can be seen that the wear levels are lower in the inventive method than in comparative method. Moreover, the property of sliding surface is smooth in all cases in the inventive method, whereas, in comparative method, roughness is increased under the test condition B.

The features above are the reinforcing particles are formulated at a rate as high as 50% in the inventive method.

As described, in accordance with the inventive method, the reinforcing particles can be dispersed uniformly at a high content never achieved by the conventional manufacturing method, hence the disc rotor according to the inventive method has many excellent characteristics over the one by the conventional method.

What is claimed is:

1. A method of manufacturing an aluminum-base composite disc rotor comprising:
   i) preparing a rough-shaped disc rotor made of a mixture of aluminum powder or aluminum alloy powder with reinforcing particles;
   ii) placing a mixture of aluminum powder or aluminum alloy powder with reinforcing particles on each of the fixed positions of said rough-shaped disc rotor;
   iii) heating said mixture to at least a region of mashy state temperature; and
   iv) molding said mixture under pressure.

2. A method of manufacturing an aluminum-base composite disc rotor comprising:
   i) preparing a rough-shaped disc rotor made of a mixture of aluminum powder or aluminum alloy powder with reinforcing particles;
   ii) placing a preform made of a mixture of aluminum powder or aluminum alloy powder with reinforcing particles on each of fixed positions of said rough-shaped disc rotor;
   iii) heating said preform to at least a region of mashy state temperature; and
   iv) molding said preform under pressure.

3. A method of manufacturing an aluminum-base composite disc rotor comprising:
   i) placing a mixture of aluminum powder or aluminum alloy powder with reinforcing particles on each of fixed positions of a rough-shaped disc rotor made of aluminum alloy;
   ii) heating said mixture to at least a region of mashy state temperature; and
   iii) molding said mixture under pressure.

4. A method of manufacturing an aluminum-base composite disc rotor comprising:
   i) placing a preform made of a mixture of aluminum powder or aluminum alloy powder with reinforcing particles on each of fixed positions of a rough-shaped disc rotor made of aluminum alloy;
   ii) heating said preform to at least a region of mashy state temperature; and
   iii) molding said preform under pressure.

* * * * *